United States Patent
Kim

(10) Patent No.: US 11,805,937 B2
(45) Date of Patent: Nov. 7, 2023

(54) HEATING COOKER USING CERAMIC HEATING ELEMENT AND MANUFACTURING METHOD THEREFOR

(71) Applicant: PELLYTECH CO., LTD., Busan (KR)

(72) Inventor: Jong Hyun Kim, Busan (KR)

(73) Assignee: PELLYTECH CO., LTD., Busan (KR)

(*) Notice: Subject to any disclaimer, the term of this patent is extended or adjusted under 35 U.S.C. 154(b) by 0 days.

(21) Appl. No.: 16/096,539

(22) PCT Filed: Apr. 25, 2017

(86) PCT No.: PCT/KR2017/004364
§ 371 (c)(1),
(2) Date: Oct. 25, 2018

(87) PCT Pub. No.: WO2017/188695
PCT Pub. Date: Nov. 2, 2017

(65) Prior Publication Data
US 2019/0133370 A1    May 9, 2019

(30) Foreign Application Priority Data
Apr. 25, 2016  (KR) .................. 10-2016-0049799

(51) Int. Cl.
*C04B 41/45*   (2006.01)
*A47J 36/04*   (2006.01)
(Continued)

(52) U.S. Cl.
CPC ............ *A47J 36/04* (2013.01); *A47J 36/027* (2013.01); *B05D 3/02* (2013.01); *B05D 3/12* (2013.01);
(Continued)

(58) Field of Classification Search
CPC .... B05D 3/02; B05D 3/12; B05D 5/08; C04B 41/45; C04B 41/4507; C04B 41/4539; C04B 41/4576
See application file for complete search history.

(56) References Cited

U.S. PATENT DOCUMENTS 2,317,803 A * 4/1943 Reeves .................. C10G 11/04
                                                  208/120.25
4,810,845 A * 3/1989 Seaborne ........... B65D 81/3446
                                                  206/591
(Continued)

FOREIGN PATENT DOCUMENTS

CN        101429351 A  *  5/2009
CN        105176149 A  * 12/2015
(Continued)

OTHER PUBLICATIONS

International Search Report for International Application No. PCT/KR2017/004364; dated Nov. 6, 2017.

*Primary Examiner* — Nathan H Empie
(74) *Attorney, Agent, or Firm* — KILE PARK REED & HOUTTEMAN PLLC

(57) ABSTRACT

The present invention relates to a heating cooker using a ceramic heating element and a manufacturing method thereof, the method comprising: a cooker body preparation step; a heating element material preparation step of preparing any one or more selected from among mill scale, steelmaking slag and magnetite ($Fe_3O_4$); an inorganic binder preparation step of preparing, as an inorganic binder, a colloidal silica sol having a colloidal silica content of 8 to 30 wt %; a mixing step of mixing 20 to 40 parts by weight of the colloidal silica sol as the inorganic binder with 100 parts by weight of the heating element material, thereby making a heating material paste; an application step of applying the heating element paste to the bottom of the cooker body; and (Continued)

a drying and curing step of drying and curing the heating element paste, thereby forming a solid heating element.

15 Claims, 5 Drawing Sheets

(51) Int. Cl.

| | | |
|---|---|---|
| C04B 35/622 | (2006.01) | |
| A47J 36/02 | (2006.01) | |
| C04B 35/626 | (2006.01) | |
| C04B 35/63 | (2006.01) | |
| C04B 33/138 | (2006.01) | |
| C04B 33/132 | (2006.01) | |
| C04B 35/82 | (2006.01) | |
| C04B 33/135 | (2006.01) | |
| C04B 35/26 | (2006.01) | |
| B05D 3/02 | (2006.01) | |
| B05D 5/08 | (2006.01) | |
| B05D 3/12 | (2006.01) | |

(52) U.S. Cl.
CPC .............. *B05D 5/08* (2013.01); *C04B 33/138* (2013.01); *C04B 33/1324* (2013.01); *C04B 33/1352* (2013.01); *C04B 35/26* (2013.01); *C04B 35/6263* (2013.01); *C04B 35/62204* (2013.01); *C04B 35/6316* (2013.01); *C04B 35/82* (2013.01); *C04B 41/45* (2013.01); *C04B 41/4507* (2013.01); *C04B 41/4539* (2013.01); *C04B 41/4576* (2013.01); *C04B 2235/3272* (2013.01); *C04B 2235/3418* (2013.01); *C04B 2235/5256* (2013.01); *C04B 2235/5427* (2013.01); *C04B 2235/5454* (2013.01)

(56) References Cited

U.S. PATENT DOCUMENTS

| | | | |
|---|---|---|---|
| 2002/0012760 A1* | 1/2002 | Barry | C08K 3/01 428/35.7 |
| 2004/0118837 A1* | 6/2004 | Samuels | A47J 36/027 219/725 |
| 2005/0241537 A1* | 11/2005 | Hicks | C04B 18/08 106/705 |
| 2014/0208957 A1* | 7/2014 | Imai | F24C 7/082 99/342 |

FOREIGN PATENT DOCUMENTS

| | | | | |
|---|---|---|---|---|
| EP | 2982614 A1 * | 2/2016 | ......... | B65D 81/3446 |
| JP | 08-024121 | 1/1996 | | |
| JP | 2000-189315 | 7/2000 | | |
| KR | 10-1996-0001644 | 1/1996 | | |
| KR | 10-0109938 | 9/1996 | | |
| KR | 10-2003-0033196 | 5/2003 | | |
| KR | 10-2005-0080036 | 8/2005 | | |
| KR | 20050080036 A * | 8/2005 | | |
| KR | 10-2005-0090337 | 9/2005 | | |
| KR | 10-2006-0062209 | 6/2006 | | |
| KR | 10-2009-0010823 | 1/2009 | | |
| KR | 10-2012-0118754 | 10/2012 | | |
| KR | 10-1317922 | 10/2013 | | |
| KR | 10-1428945 | 9/2014 | | |
| KR | 10-1524637 | 6/2015 | | |
| KR | 10-2016-0010156 | 1/2016 | | |

\* cited by examiner

Comparison of thermal efficiency

1. Comparison of temperature rise per minute

| Classification | 1min | 2min | 3min | 4min | 5min | 6min | 7min | 8min |
|---|---|---|---|---|---|---|---|---|
| Conventional art | 150 | 218 | 279 | 308 | 335 | 334 | 348 | 352 |
| The present invention | 233 | 318 | 353 | 369 | 371 | 377 | 388 | 388 |

2. Graph comprising temperature rise per minute

HEATING COOKER USING CERAMIC HEATING ELEMENT AND MANUFACTURING METHOD THEREFOR

TECHNICAL FIELD

The present invention relates to a heating cooker, such as a cooking pot or tray, which comprises a ceramic heating element that generates heat by absorbing microwaves, and a method for manufacturing the same, and more particularly to a heating cooker comprising a more efficient and safe ceramic heating element that releases high-temperature heat and that can resist ultrahigh temperatures (heat-resistant temperature: 800° C.), and to a method for manufacturing the same.

BACKGROUND ART

Microwaves are used as clean energy because they do not generate carbon dioxide or harmful gas. In addition, microwaves have an excellent ability to be converted immediately into thermal energy, compared to the conductive heat from an electric heater or gas energy. Accordingly, microwaves have recently been applied in various industrial applications, and various means and methods for applying microwaves have been proposed.

A basic microwave oven generally uses only microwaves to cook food, and thus have problems in that it cannot bake food because it cannot generate high-temperature heat and in that the water contained in food evaporates, making the food hard and dry, due to the principle of dielectric heating that heats the inside and outside of the food at the same time, and also in that shelled food such as an egg can explode. Due to these problems, it has generally been used for simple heating of food.

To overcome these problems, microwave oven manufacturers have also launched a microwave oven equipped with a means capable of baking food, such as a heating device. However, although the microwave oven equipped with the heating device can effectively bake food, it has problems in that it is expensive and consumes a large amount of electricity.

However, with the development of the technology in which a heating element that converts microwaves into thermal energy is used for the heating means of a microwave oven, it became possible to solve the problems occurring in microwave oven cooking. That is, it made possible to bake food within a short time, and to cook without making it hard and dry, and also to cook shelled food such as an egg without explosion. Accordingly, various food cookers comprising a heating element that generates heat by absorbing microwaves have been launched, and microwave oven manufacturers have also launched a combination microwave oven equipped with an electric heating device or heating tray that increases the cooking ability of the microwave oven.

In recent years, there has been developed a microwave oven that can cook food by combined use of microwave energy and the exothermic energy of a tray capable of replacing an electric heating device that consumes a large amount of electricity. This makes it possible to reduce cooking and heating energy and to bake food with (far) infrared rays at high temperature during cooking, thus reducing the generation of smell and smoke.

The types of heating cookers comprising a heating element that generate heat using microwaves from conventional microwave ovens will now be described.

First, there is a technology in which silicone rubber and ferrite are compounded and attached to a tray bottom by molding and which use the heating power of the compounded material. This technology is disclosed in Korean Patent No. 10-0109938, Korean Patent Application Publication No. 10-1996-0001644, etc.

The tray manufactured using the above technology is currently used mainly as an internal part by microwave oven manufacturers in China, USA, Europe, Japan, China, Korea, etc., and the heating element is obtained by compounding silicone robber with ferrite and is attached to the bottom of a metal tray. Thus, the heating element has advantages in that it has good adhesion due to the physical properties of the silicone rubber, is easily produced, and is easy to handle. However, the heating element has a problem in that, because the silicone rubber is used as a binder for the ferrite, the heat-resistant temperature of the heating element is limited to the heat-resistant temperature of the silicone rubber.

Namely, there is a limitation in that the temperature of the heating element cannot be increased to 250° C. or higher, because the heat-resistant temperature of the silicone rubber is about 250° C. In addition, there is a problem in that when the heating element reaches 250° C. or higher, the silicone rubber burns and smokes, and bubbles are formed at the bottom due to thermal expansion. For these reasons, the tray is not suitable as a cooker for generating high heat, and when it is used as a food cooker, it is convenient in that a long heating time for cooking is consumed.

Second, there is a ceramic heating material technology in which ceramic material clay is mixed with silicon carbide, carbon, other metal oxide, etc., which is a heating material, and the mixture is magnetized at 900 to 1300° C. This technology is disclosed in Korean Patent Application No. 10-2003-0033196, Korean Patent Application No. 10-2016-0010156, Korean Patent No. 10-1428945, Korean Patent No. 10-1317922, etc.

The magnetized ceramic heating element technology is generally applied in three ways.

In one way, a heating element material is kneaded with ceramic clay, and then molded into a heating container, dried and magnetized, thereby obtaining a product. The product is used as a "magnetized heating cooker".

In another way, a heating element material is mixed with ceramic clay and prepared into a "magnetized heating plate", and the magnetized heating plate is disposed at the bottom of a cooking metallic tray. The heat generated from the heating plate is conducted to a metallic pan, and food is heated by the conducted heat.

In still another way, a heating element material is embedded into the bottom of a ceramic container or coated on the bottom, thereby providing a heating cooker.

The above-mentioned "magnetized heating cooker" has advantages in that it is a cooker made of a high-strength ceramic material, and thus is environmentally friendly, and in that the ceramic cooker can perform microwave cooking at higher temperatures than conventional ceramic containers. However, it has problems in that because microwaves are transmitted through ceramic or glass material, microwaves pass through the food being cooked, making the food dry and exploding shelled food such as an egg, indicating that the magnetized heating cooker cannot escape from the limit of microwave cooking.

In addition, there are disadvantages in that because the material is a ceramic material, the container itself becomes very hot when microwaves are transmitted, and thus can jeopardize user safety, can cause burn injuries, and is inconvenient to handle.

In addition, in the technology that heats food heated by the conductive heat generated by the application of microwaves to the "magnetized heating plate", a problem arises in that when the magnetized heating plate receives high heat, the adhesion thereof decreases due to the thermal expansion and shrinkage of the metallic tray, and thus heat conduction cannot be smoothly performed. Due to this problem, the rate of heat conduction to the metallic tray is low, and thus the temperature of the pan is low, so that there is an inconvenience that the cooking time is long.

Among the types of heating cookers comprising a heating element that generate heat using microwaves from conventional microwave ovens, the third technology is disclosed in Korean Patent Application Publication No. 10-2005-0080036, Korean Patent Application Publication No. 10-2005-0090337, etc. The one disclosed therein is obtained by mixing an iron scale (mill scale) as a main component with a silicone binder, followed by curing at high temperature. Specifically, it is a heating plate obtained by removing water and gas from an iron scale, which contains iron oxide as a main content (iron oxide content: 55 to 88 wt %) and has a particle diameter of 0.01 μm to 1 mm), at a temperature of 300 to 400° C. for 1 to 3 hours, and kneading 60 to 90 wt % of the resulting powder with 10 to 40 wt % of a flame-retardant, heat-resistant silicone rubber, followed by curing at a temperature of 300 to 350° C. for 1 to 3 hours.

In the above technology, the silicone rubber is used as a basic binder, but when components, such as silicone oil, silicone gum and the like, contained in the silicone rubber, are removed by burning at 300 to 350° C. in the final curing step, the amorphous silica contained in the silicone rubber functions as a binder that binds the heating element. In this technology, problems arises in that because the basic binder is the silicone rubber, curing of the silicone rubber at high temperature (300 to 350° C.) and removal of gas therefrom are time-consuming, and the silicon oil or gum components contained in the silicone rubber are emitted by burning at high temperature, causing environmental pollution problems.

In addition, the above-described technology has a problem in that a ceramic thermal insulating material and a support body are necessarily required to attach and support the heating element upward.

DISCLOSURE

Technical Problem

Accordingly, the present invention has been made in order to solve the above-described problems occurring in the prior art, and it is an object of the present invention to provide a heating cooker for a microwave oven comprising a heating element having excellent heat resistance and durability, which is attached firmly to the bottom of the cooker, can resist even ultra-high temperature, and is maintained without cracking or thermal damage even when undergoing thermal expansion or shrinkage.

Another object of the present invention is to provide a heating cooker for a microwave oven comprising a heating element having a high ability to absorb microwaves and generate heat, which comprises, as a heating material, mill scale, steelmaking slag or magnetite, which is a ferromagnetic material.

Technical Solution

To achieve the above objects, the present invention provides a method for manufacturing a ceramic cooker comprising a ceramic heating element, the method comprising: a cooker body preparation step of preparing a cooker body by molding; a heating element material preparation step of preparing, as a microwave-absorbing ceramic element material, any one or more selected from among mill scale, steelmaking slag and magnetite ($Fe_3O_4$), which are ferromagnetic materials and have a particle size of 3 mm or less; an inorganic binder preparation step of preparing, as an inorganic binder, a colloidal silica sol having a colloidal silica content of 8 to 30 wt % by adding acetic acid to sodium silica, followed by stirring for 30 minutes to 1 hour, thereby forming a silicate, and then adding a solvent to the silicate such that the content of the solvent is 70 to 92 wt %, followed by stirring for 2 to 3 hours; a mixing step of mixing 20 to 40 parts by weight of the colloidal silica sol as the inorganic binder with 100 parts by weight of the heating element material, thereby making a heating element paste; an application step of applying the heating element paste, obtained by the mixing, to the bottom of the cooker body; and a drying and curing step of drying and curing the heating element paste applied to the bottom of the cooker body, thereby forming a solid heating element.

Here, the method may further comprise, after the cooker body preparation step, a surface treatment step of treating the surface of the bottom of the cooker body in order to increase the adhesion between the heating element and the bottom of the cooker body.

At this time, the surface treatment step preferably comprises performing one or more processes, selected from among sanding and matt enamel layer coating, on the surface of the bottom of the cooker body.

In addition, the application step preferably comprises applying the mixture of the heating element material and the inorganic binder to any one surface selected from among the upper surface and lower surface of the cooker body.

Furthermore, the cooker body preparation step may comprise forming a heating element groove on the bottom of the cooker body, and the application step may comprise applying the heating element paste to the heating element groove.

Furthermore, the method may further comprise, after the drying and curing step, a non-stick water-repellent coating step of subjecting the surface of the heating element to non-stick water-repellent coating.

Meanwhile, the inorganic binder may further comprise, based on 100 parts by weight of the colloidal silica sol, 10 to 30 parts by weight of any one or more selected from among fly ash and silica fume.

In addition, the inorganic binder may further comprise, based on 100 parts by weight of the colloidal silica sol, 1.5 to 6 parts by weight of quick hardening cement.

In addition, the application step may also comprise embedding one or more, selected from among wire mesh and glass fiber mesh, into the heating element.

Meanwhile, the present invention provides, as another technical subject matter, a heating cooker comprising a ceramic heating element, which is characterized by being manufactured by the above-mentioned method.

At this time, a metallic cover having formed therein a plurality of holes into which microwaves are introduced may also be attached to the lower end of the heating element which is attached to the lower surface of the cooker body.

In addition, the heating cooker may be configured such that: a ceramic thermal insulating sheet is disposed in contact with the lower surface of a heating element attached to the lower surface of a cooker body; the heating cooker comprises a support formed along the outside of the cooker body so as to be parallel with the outside while coming in contact with the lower surface of the ceramic thermal insulating sheet; and an engaging protrusion protruding externally from the upper edge of the cooking body is fitted in an engaging groove formed on the inner side of the upper edge of the support, so that the support supports the heating element upward by an upward pressure which is applied to the ceramic thermal insulating sheet, and thus the heating element is attached closely to the lower surface of the bottom of the cooker body.

In addition, the heating cooker may also comprise: an upper heating cooker manufactured by the above-mentioned method; a lower heating cooker manufactured by the above-mentioned method; and a hinge formed at one side of each of the upper heating cooker and the lower heating cooker and configured to couple the upper and lower heating cookers to each other.

Advantageous Effects

The heating element provided in the heating cooker according to the present invention has the advantages of having excellent adhesion and heat resistance and having significantly better heating power than conventional heating elements employing microwaves.

Moreover, a basic binder which is applied to the heating element provided in the heating cooker according to the present invention has advantages in that it may be dried and cured within a short time after being into a silica sol and may be cured at low temperature (150 to 200° C.), making the production process easy and simple, thus making it possible to have a mass production system.

Furthermore, because the main material of the binder of the heating element provided in the heating cooker according to the present invention is a paste obtained using a silica sol, it is effective in that it makes it possible to manufacture heating cookers having various shapes, such as a uneven grill pan, a circular pan, a rectangular pan, etc., regardless of the shape of the heating cooker.

Furthermore, the heating cooker according to the present invention has an advantage in that it can use clean energy that can be free from carbon dioxide gas emission, which is caused by gas-fired heating and is the main cause of global warming, and from emission of unburned toxic gases.

Furthermore, the heating cooker according to the present invention has higher energy efficiency than a cooker equipped with an electric heater, and thus has an energy saving effect.

In addition, the heating cooker cooks food by high-temperature (far) infrared radiant heat converted from microwaves. That is, it performs cooking by high-temperature (far) infrared radiant heat, not by electromagnetic waves. Thus, it has the effect of maintaining the inherent taste and flavor of food.

BEST MODE

Hereinafter, preferred embodiments of the present invention will be described in detail with reference to the accompanying drawings. In the following description of the embodiments of the present invention, the detailed description of particulars, which are not related directly to the technical features of the present invention or are obvious to those skilled in the technical field to which the present invention pertains, will be omitted.

The present invention is directed to a method for manufacturing a heating cooker comprising a ceramic heating element that generates heat by absorbing microwaves, and to a heating cooker manufactured thereby. The method for manufacturing the ceramic cooker comprising the ceramic cooker comprises a cooker body preparation step, a surface treatment step, a heating element material preparation step, an inorganic binder preparation step, a mixing step, an application step, a drying and curing step, and a non-stick water-repellent coating step.

Hereinafter, the method for manufacturing the heating cooker will be described in more detail.

1. Cooker Body Preparation Step

A cooker body 1 of the present invention is a body to which a heating element to be described below is attached. It includes either a cooker body made of a heat-resistant material, such as a metallic or ceramic material, a glass material or the like, or a cooker body made by binding a heating element material using a silica sol binder without attaching a heating element.

It is designed according to the intended use. That is, it is designed according to dimensions, a shape and a design, which may be used in a cooker for a microwave oven, a microwave-based dryer, or the like.

Figure 1:
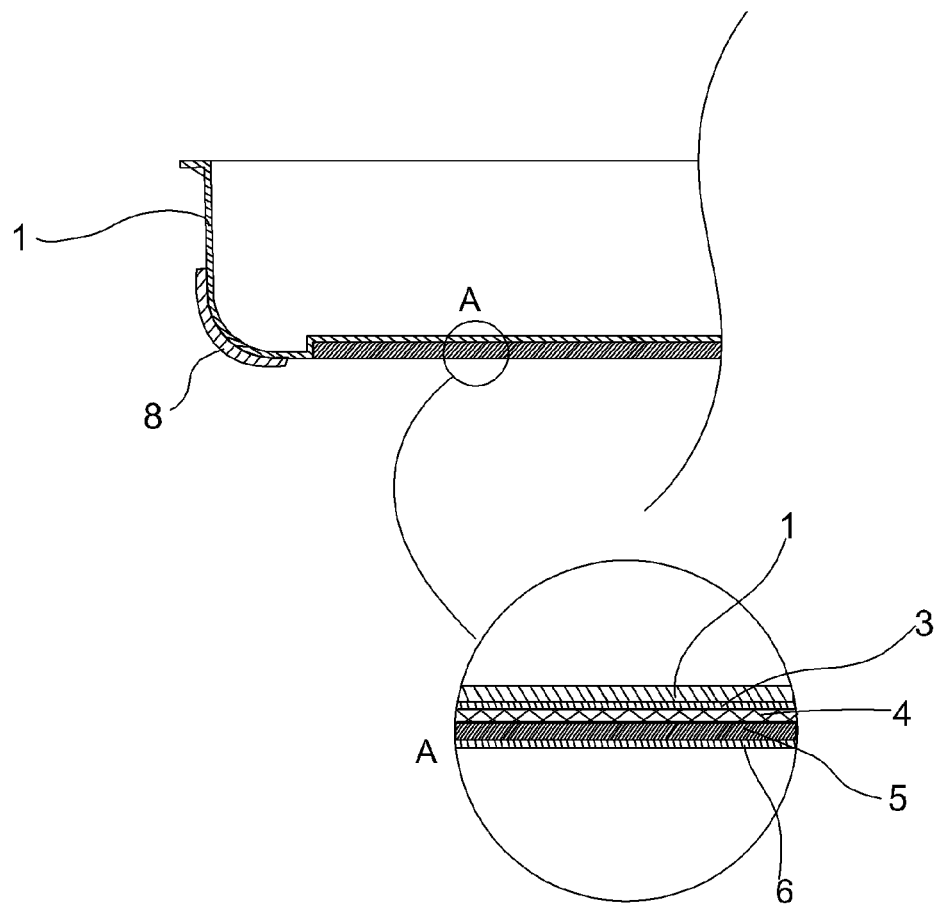
FIG. 1 is a sectional view showing one embodiment of the present invention.
Figure 2:
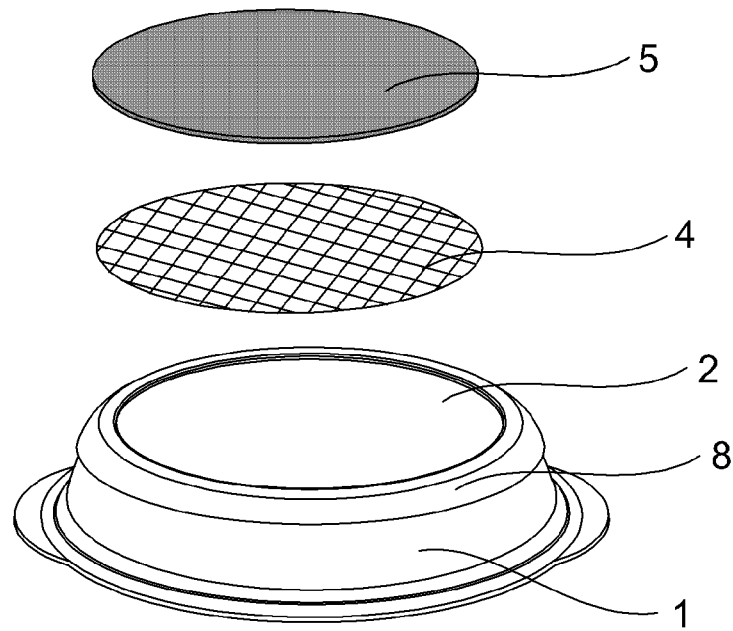
FIG. 2 is an exploded perspective view of the present invention.

As shown in FIGS. 1 and 2, on the bottom of the cooker body 1, a heating element groove 2 may be formed, which is a portion to which a heating element to be described below is attached. Considering the thickness of the heating element 5, a groove portion may be formed on the bottom of the cooker body 1 so as to have a depth corresponding to the thickness of the heating element 5, thereby forming the heating element groove 2. Alternatively, although not shown in the figures, a protruding guide may also be formed on the bottom of the cooker body 1, thereby forming the heating element groove 2. To the heating element groove 2 formed as described above, a heating element paste mixed with a binder is applied to a predetermined thickness in the application step to be described below. However, it is to be understood that the heating element may also be applied without forming the heating element groove 2 on the bottom of the cooker body 1.

2. Surface Treatment Step

This step is a process of sanding a portion of the cooker body 1, to which the heating element is attached. This step may remove foreign matter and make the surface rough, thereby increasing the adhesion of the heating element 5. In addition, as shown in FIG. 1, in order to form an adhesive bridging layer between the cooker body 1 and the heating element 5, a matt enamel layer 3 may also be coated on a surface to which the heating element 5 is to be attached, after which the heating element paste to be described below may be applied thereon to have a predetermined thickness. In this case, the heating element 5 can be strongly attached to the matt enamel layer 3.

The matt enamel layer 3 may be coated using a matt enamel coating method generally known to those skilled in the art. The matt enamel layer of the present invention is a bridging coating layer that is well adapted to the thermal expansion and shrinkage of the metallic cooker body 1 and ensures stable adhesion while ensuring heat resistance. Preferably, as the main material of the matt enamel layer, enamel is prepared by mixing 10 to 40 wt % silica stone, 10 to 20 wt % feldspar, 15 to 20 wt %, and any one or more components selected from among soda ash, nickel oxide, cobalt oxide, and manganese, and the enamel is applied to the heating element groove 2 and calcined at 800 to 900° C., thereby attaching the enamel to the heating element groove.

The matt enamel layer 3 has a rough surface and includes naturally formed internal pores, and thus a silica sol component described below, which is the binder of the present invention, permeates into the internal pores through the rough surface of the matt enamel layer 3, thereby increasing the adhesion to the heating element.

3. Heating Element Material Preparation Step

A heating element material that is used in the present invention is any one or more selected from among ferromagnetic mill scale, steelmaking slag and magnetite ($Fe_3O_4$).

The mill scale is a ferromagnetic material having better heating performance and thermal conductivity than common ceramics. Thus, in the present invention, the mill scale is used as a main component.

The mill scale is an oxide layer produced by high-temperature oxidation with air oxygen during rolling or thermal processing of steel at 800° C. or higher. It contains iron oxides, including FeO, $Fe_3O_4$ and $Fe_2O_3$, in an amount of 60 to 70%, and also contains small amounts of silicon, zinc, copper, chromium, nickel, alumina and the like. Although the content of iron oxides in mill scale differs depending on the source of iron ore, mill scale containing iron oxides as a main component in an amount of 60% is preferably used in the present invention.

Blast furnace slag and steelmaking slag are generated during steelmaking processes. Blast furnace slag is a residue generated in a steelmaking process that refines iron, and it is a non-iron-containing portion of iron ore, which comes from a blast furnace. Steelmaking slag is an impurity coming from a steelmaking step and contains iron.

An iron-containing steelmaking slag that is used in the present invention is a ferromagnetic material. It contains, as a main component, iron oxide ($Fe_2O_3$) that emits high heat when microwaves are applied, and also contains calcium oxide, silicon dioxide, and the like. Preferably, crushed steelmaking slag having an iron oxide content of 60% or more is used in the present invention.

The magnetite ($Fe_2O_3$) is a ferromagnetic mineral. In the present invention, crushed magnetite having an iron oxide content of 60% or more is preferably used.

In addition, because the raw materials of the heating element materials have a non-uniform particle size distribution and contain a large amount of foreign matter, those obtained by removing foreign matter and crushing to a predetermined particle size or less are used in the present invention. Since a sieve having a mesh size of 3 mm is used to screen the heating elements, the screened heating elements contain micrometer-sized fine powder and have a particle size up to 3 mm.

Furthermore, the heating element materials are all ferromagnetic materials having similar properties. Thus, when they are used as a mixture, the mixing ratio has no great impact on temperature rise, but the temperature changes depending on the microwave output and the weight of heating element introduced into the cooker body.

When those containing fine powder and having a particle size of 3 mm or less are used as the heating element materials, a large number of pores are formed between the heating element particles after the heating element materials are bound to the binder and cured, so that the heating element can be adapted well to thermal expansion and shrinkage, thereby increasing heat resistance. In addition, the heating element structure having a large number of pores formed therein has an increased surface area between the heating particles, and microwaves are introduced into the heating element through the formed pores. This can increase the microwave absorption rate, thus further increasing the heating power compared to that of a heating element having a dense structure.

Accordingly, the particle size of the heating element is very important to increase the heating power, and thus the present invention proposes a heating element having a number of pores formed therein.

4. Inorganic Binder Preparation Step

As a basic inorganic binder that is used in the heating element of the present invention, colloidal silica sol is used. The silica sol that is used in the present invention is preferably one in which the content of colloidal silica dispersed in a solvent is 8 to 30%.

Furthermore, an increase in the content of colloidal silica leads to an increase in the strength of the heating element, but has no great effect on the heating power. Thus, the content of colloidal silica is determined considering the required strength of a tray and the heating power.

In a preferred embodiment of the present invention, a silica sol having a colloidal silica content of 8 to 30 wt % and a water content of 70 to 92 wt % is used, which is produced by adding an acid to sodium silica, followed by stirring for about 30 minutes to 1 hour, thereby forming a silicate, and then adding water to the silicate, followed by stirring for 2 to 3 hours.

The solvent of the colloidal silica, which is used in the present invention, may be not only water, but also an organic solvent such as alcohol. The use of an organic solvent such as alcohol generates an unpleasant odor, but has in that the curing time can be reduced due to quick drying rate.

The silica sol is one in which silica is stably dispersed colloidally in water or an organic solvent. It has a particle size of 1 to 100 nm and forms an amorphous porous three-dimensional network structure comprising siloxane bonds. Thus, it has excellent binding ability and heat resistance, and particularly, is adapted well to thermal expansion and shrinkage.

Hereinafter, a preferred method for preparing the silica sol according to the present invention will be described in more detail.

A preferred heating element of the present invention is prepared using a silica sol which does not cause heat shock-induced crack, allows a large number of pores to be formed in the structure, thus increasing the microwave absorption rate and the heating power, has low raw material costs, and is prepared by a simple and convenient process.

(1) The main materials of a preferred silica sol of the present invention are sodium silicate, acetic acid, and distilled water.

① Sodium silicate that is used is classified, according to Korean Industrial Standard (KSM1415), into type 1, type 2, type 3 and type 4. The content of $SiO_2$ is 36 to 38% for type 1, 34 to 36% for type, 28 to 30% for type 3, and 23 to 25% for type 4. Any one selected from among the sodium silica types is used as the raw material of the silica sol of the present invention.

② A preferred acid that is used in the present invention is preferably 99% acetic acid which harmless to the human body, because it is applied to a food cooker.

③ As water that is a solvent, distilled water is used, which is harmless to the human body and has no volatile odor.

<Reaction Between Sodium Silicate and Acid of Silica Sol According to the Present Invention>

When an acid (sulfuric acid, hydrochloric acid, phosphoric acid, acetic acid, or the like) is added to a sodium silicate solution, the pH is reduced by alkali neutralization, and polymerization of silicate ions or polysilicate ions (production of siloxane bonds) proceeds, thus increasing the viscosity. When the polymerization further proceeds, curing into gel occurs.

Example of Reaction with Acetic Acid

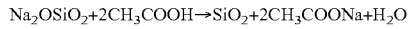

$Na_2OSiO_2 + 2CH_3COOH \rightarrow SiO_2 + 2CH_3COONa + H_2O$

Factors that Influence the Rate of Gelling

The rate of gelling varies depending on the type of sodium silicate and the type, amount, concentration and temperature of acid.

(2) Content of Sodium Silicate that is Added in the Present Invention

Sodium silicate is classified, according to Korean Industrial Standard (KSM1415), into type 1, type 2, type 3 and type 4. In order to adjust the solvent content to 70-92 wt % relative to the content (wt %) of $SiO_2$, which is required in the present invention, the amount of solvent added is adjusted depending on the type of sodium silicate. That is, as the amount of solvent added increases, the content of $SiO_2$ decreases, and as the amount of solvent added decreases, the content of $SiO_2$ increases.

(3) Preferred Content of Acetic Acid that is Added in the Present Invention

① The preferred content of acetic acid used to make a silicate which is required in the present invention is 1.2 to 2 wt %.

② When acetic acid is added in an amount of more than 2 parts by weight based on 100 parts by weight of sodium silicate and stirred, the resulting silicate is in a hard gel state, and thus is not dissolved even when a solvent is additionally added, followed by stirring. This indicates that the silica sol required in the present invention is not formed.

③ When acetic acid is added in an amount of 1.2 parts by weight or less, the pores required in the present invention are not formed, and the drying time becomes longer. In addition, a problem arises in that bubbles are formed on the surface of the heating element during drying, thus increasing the defective rate.

④ However, the silica sol of the present invention is prepared using either an acid other than acetic acid or an alcohol, the result varies depending on the type of sodium silicate and the type, amount, concentration and temperature of acid. Thus, the ratio may be adjusted to the most suitable ratio, and preparation may be performed.

(4) Content of Solvent that is Added in the Present Invention

① The content of a preferred solvent according to the present invention is 70 to 92 wt %.

② A preferred solvent that is used in the present invention is distilled water which is harmless to the human body and odorless.

③ Acetic acid is added to a sodium silicate solution and stirred for 30 minutes to 1 hour, and then a solvent is additionally added, followed by further stirring for 2 to 3 hours.

④ As the amount of solvent added increases, the content of $SiO_2$ decreases, and as the amount of solvent added decreases, a silica sol having an increased content of $SiO_2$ is prepared.

As the concentration of $SiO_2$ in the silica sol of the present invention is increased, the binding strength of the heating element becomes stronger, the number of pores in the structure decreases, resulting in a decrease in the heating power, and as the concentration is decreased, the binding ability of the heating element becomes weaker, but the number of pores in the structure increases, resulting in an increase in the heating power. Accordingly, the concentration is selected depending on the required properties of the heating element.

⑤ For a product whose heating power needs to be increased, a large amount of a solvent is preferably added. However, when the solvent is added such that the solvent content exceeds 92 wt %, the silica sol has no binding ability and is ineffective as a binder. When heating power and binding ability are required at the same time, the amount of solvent added may be decreased. However, when the solvent content is decreased to 70% or less, there are disadvantages in that the heat shock resistance becomes weaker, and cracks occur under high heat, thus increasing the defective rate.

Preparation Example of Silica Sol

① To 1,000 g of type 2 sodium silicate having a $SiO_2$ content of 34 to 36%, 1.5 wt % of 99% acetic acid is added, followed by stirring for 30 minutes to 1 hour, thereby producing a silicate.

② When 1,000 g of distilled water to ①, followed by high-speed stirring for 2 to 3 hours, the silicate content becomes about 17.5 wt %, and the content of the solvent distilled water becomes about 82.5 wt %. Thus, this method may be used as one of preferred silica sol preparation methods of the present invention.

The heating plate in Korean Patent Application Publication No. 10-2005-0080036 (filed in the name of the present inventor), mentioned when describing the prior art above, is a heating plate by mixing iron scale (mill scale) as a main component with a silicone binder, followed by curing at high temperature. Specifically, it is a heating plate obtained by removing water and gas from an iron scale, which contains iron oxide as a main content (iron oxide content: 55 to 88 wt %) and has a particle diameter of 0.01 μm to 1 mm), at a temperature of 300 to 400° C. for 1 to 3 hours, and kneading 60 to 90 wt % of the resulting powder with 10 to 40 wt % of a flame-retardant, heat-resistant silicone rubber, followed by curing at a temperature of 300 to 350° C. for 1 to 3 hours.

In this technology, the silicone rubber is used as a basic binder, but when components, such as silicone oil, silicone gum and the like, contained in the silicone rubber, are removed by burning at 300 to 350° C. in the final curing step, the amorphous silica contained in the silicone rubber functions as a binder that binds the heating element. This technology appears to be similar to the present invention in that it uses the amorphous silicon binder and uses iron scale (mill scale) as a heating material. However, in this technology, the basic binder is the silicone rubber, and thus curing of the silicone rubber at high temperature (300 to 350° C.) and removal of gas therefrom are time-consuming, and the silicon oil or gum components contained in the silicone rubber are emitted by burning at high temperature, causing environmental pollution problems.

However, the basic binder that is used in the present invention is a silica sol and has advantages in that it causes no environmental pollution and can be cured at a relatively low temperature of 150 to 200° C., so that the production cost can be reduced. In this respect, it differs from the conventional one.

Namely, the binder that is used in the manufacture of the heating element of Korean Patent Application Publication No. 10-2005-0080036 as described above is silicone, that is, silicone rubber. Silicone means a polymer in which organosilicone containing an organic group is linked with oxygen or the like by a chemical bond. The silicone that is used in the conventional art is silicone rubber having both organic and inorganic properties. Thus, the silicone is a material comprising a combination of organic and inorganic materials.

The heat resistance of the heating element obtained using the silicone as a binder is restricted by the heat resistance of the silicone rubber, and thus is about 300° C. or lower. Thus, when the temperature of the heating plate is increased to 300° C. or higher, a problem arises in that the binder loses it binding ability, and thus the molded heating element becomes brittle.

After mixing and molding, the heat-curing process comprises a process of releasing water and gas by heating in a heater at 250 to 350° C. for 3 to 12 hours. The silicone heating plate has a problem in that when the temperature of the heater reaches about 250° C. or higher, large amounts of gaseous smoke and odor (smoke containing a large amount of oil-containing ash and an odor generated while the curing agent of the silicone oil burns) are generated while the silicone oil and organic component contained in the heating plate are burned, thus polluting the atmosphere.

In addition, the binder according to the conventional art has a problem in that it loses its binding ability at a high temperature of 300° C. or higher, because rubber which is the organic component of the silicone is burned.

Furthermore, in the conventional art, problems arise in that a large amount of iron scale dust is generated in the process of mixing iron scale and silicone rubber, and thus the worker experiences the discomfort of wearing a mask, and in that working safety is not ensured due to the large roller device of the mixing machine.

In addition, since the mixing process is performed to mix the silicone rubber and the heating material, it takes a lot of time (about 5 hours).

Furthermore, in the conventional art, there are disadvantages in that the time required for curing is as long as 3 to 12 hours, and thus a lot of time is taken to produce the heating plate, and in that electricity costs are high due to the use of the heater.

However, as described above, the silica sol that is used in the present invention is one obtained by removing alkaline ions from sodium silicate, and is a colloidal inorganic binder containing silicate ($SiO_2 \cdot nH_2O$) fine particles dispersed in a dispersion medium such as water.

The silica sol contains the inorganic material (silicate) colloidally dispersed in a dispersion medium such as water, and thus can resist even a high temperature of 800° C. Accordingly, the heating element has an advantage in that it can resist high heat, unlike the conventional art, thus making it possible to generate high heat by increasing the microwave output.

In addition, the silica sol which is the binder of the present invention has an advantage in that because it is in a liquid state, it is completely mixed by only about 10 minutes of stirring in a drum-type mixer, and thus it can be easily and rapidly mixed without generating dust.

Figure 9:
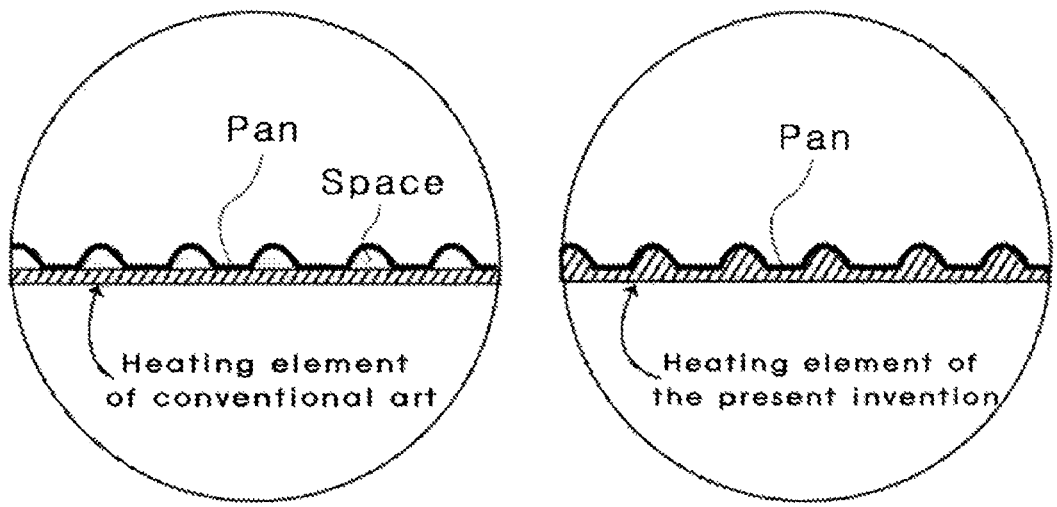
FIG. 9 is a view comparatively compares states in which a heating element according to the present invention is attached to a cooker and in which a heating element according to a conventional art is attached to a cooker.

As shown in FIG. 9(*a*), the heating element of the conventional art is formed in a solid plate shape, and thus has a problem in that when it is attached to a cooker body such as a pan having an uneven shape, an empty space in which the heating element is not present is present in the groove portion, thus reducing heat transfer rate. However, as shown in FIG. 9(*b*), the heating element according to the present invention is attached to a pan in a paste state obtained using a silica sol, and thus has an advantage in that the heating element is also inserted into all the grooves of the pan having an uneven shape, and thus can emit heat uniformly throughout the pan having the uneven shape, indicating that grill marks may appear clearly when steak or fish is baked.

Figure 10:
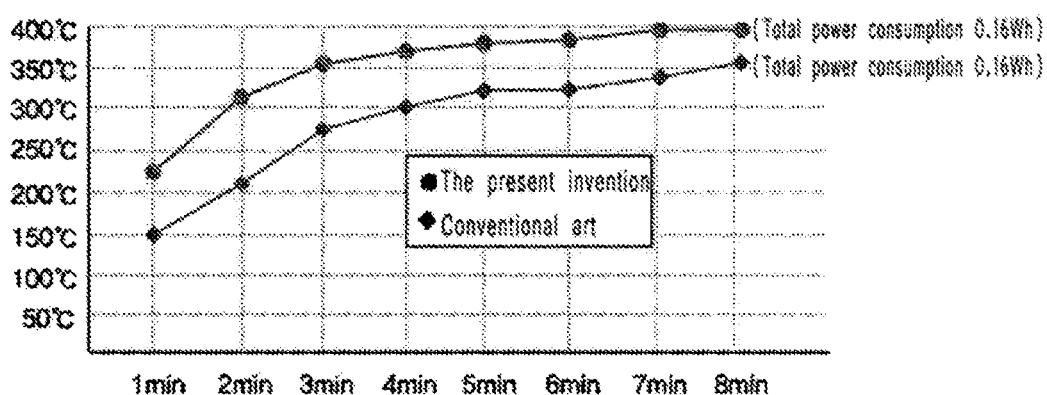
FIG. 10 is a performance analysis diagram showing the temperature change per minute of a heating cooker of the present invention.

As shown in FIG. 10, the temperature change per minute was tested, and as a result, it can be seen that the temperature rise per minute of the heating element of the present invention was much greater than that of the conventional art. This indicates that the heating element of the present invention can generate much more heat at the same power consumption.

In addition, the heating element of the present invention has an advantage in that it does not pollute the atmosphere, because it is produced in a clean environment in which smoke or gas and ash (oil-containing ash which is generated while an organic material burns) are not generated during curing.

Furthermore, the heating element according to the present invention has an advantage in that it can be cured at a relatively low temperature of 150 to 200° C. within a short time (about 1 hour), sol that the temperature and time required for the manufacture can be reduced, thus reducing the electricity bill.

Meanwhile, as another preferred inorganic binder of the present invention, one obtained by adding, to 100 parts by weight of the silica sol, 10 to 30 parts by weight of any one or more selected from among fly ash and silica fume, may be used in order to increase the strength of the heating element and improve heat dispersion.

The fly ash is coal ash produced as a by-product from a combustion boiler in a thermal power plant or the like, and the major component thereof differs depending on the production area, but is fine powder containing 30 to 60% $SiO_2$, 25 to 35% $Al_2O$, and 5 to 8% $Fe_2O_3$, as well as calcium oxide, magnesium oxide, sulfur trioxide, potassium oxide, and the like.

The silica fume is micro-silica particles obtained by collecting and filtering $SiO_2$ contained in waste gas which is generated when producing silicon (Si), ferrosilicon (FeSi), silicon alloys or the like.

The reason why fly ash or silica fume is used as a main material in the present invention is as follows. Although fly ash and silica fume have no hydraulicity, they increase the strength of the heating element by causing a pozzolanic reaction in which they are cured by reaction with calcium hydroxide. In addition, they are composed of spherical particles, and thus act as ball bearings that reduce frictional resistance during molding, thereby increasing moldability. Furthermore, the amorphous silicon component and iron oxide contained therein have the property of generating heat by absorbing microwaves, and thus function to maintain the heating performance of the present invention.

In addition, as another preferred inorganic binder of the present invention, one obtained by adding 1.5 to 6 parts by weight of quick hardening cement to 100 parts by weight of the silica sol may also be used in order to shorten the production time by increasing the curing rate of the heating element and to increase the strength of the heating element.

The same amount of the quick hardening cement may also be added to the above-described binder obtained by mixing the silica sol and fly ash or silica fume, and the resulting mixture may be used.

As the content of the quick hardening cement is increased, the curing of the heating element becomes faster, making molding difficult. For this reason, the amount of quick hardening cement added is preferably determined with reference to the time required for the production.

5. Mixing Step

The mixing step is a step of mixing the heating element material, prepared in the heating element material preparation step, with the inorganic binder prepared in the inorganic binder preparation step, thereby preparing a heating element paste.

Regarding a preferred mixing ratio in the production of the heating element according to the present invention, 20 to 40 parts by weight of the colloidal silica sol is preferably mixed with 100 parts by weight of mill scale (or steelmaking slag or magnetite) which is the heating element material.

6. Application Step

The application step is a step of applying the heating element paste, prepared by mixing the heating element material and the colloidal silica sol in the mixing step, to the bottom of the cooker body.

In this step, the heating element paste may be applied to any surface selected from among the upper surface and lower surface of the bottom of the cooker body 1, and the surface is preferably selected depending on the intended use, design and the like of the heating cooker. In addition, as mentioned also in the cooker body preparation step above, the heating element groove 2 may be formed on the upper or lower surface of the bottom of the heating cooker 1 as shown in FIGS. 1 and 2, and the heating element paste may be applied to the heating element groove 2.

In addition, as shown in FIG. 2, a wire mesh 4 or a glass fiber mesh 4 may also be embedded into the heating element paste in order to increase the adhesion and strength of the heating element. The mesh 4 is a means for reinforcing strength when a high-strength heating element is required or when the heating element 5 is thick.

The mesh preferably has a mesh size of 10 to 20 mm, and the thickness thereof may be determined considering the molded material. The mesh size of the wire mesh is preferably a size that does not interfere with microwave transmission, and the wire mesh which is used in the present invention has a well finished end is used in order to avoid spark generation. For a metallic cooker, a wire mesh welded to the bottom may also be used. Any one or more selected from among the above-described meshes depending on the thickness of the heating element 5 may be used.

7. Drying and Curing Step

As a drying method of the present invention, a forced drying method using a drying furnace and a room temperature drying method may be used. The forced drying method is a drying method which is performed in a drying furnace at 150 to 200° C., and the room temperature drying method is a slow drying method which is performed in the shade. The strength of the heating element 5 appears to be higher in room temperature drying, but the drying rate is faster in forced drying. Thus, the drying method may be selected depending on the characteristics of the applied product.

8. Non-Stick Water-Repellent Coating Step

This step is a step of forming a non-stick water-repellent coating 6 on the surface of the heating element 5 attached to the cooker body 1, after the drying and curing step. Since the cured heating element 5 of the present invention is a highly porous ceramic material, it absorbs water. When the heating element 5 absorbs water, the heating power and lifespan of the heating element are reduced. For this reason, in order to maintain the heating power and increase the durability of the heating element, a non-stick water-repellent coating should be formed on the outer surface of the heating element 5, thus preventing the heating element from absorbing water. As the coating material, a variety of conventional non-stick water-repellent coating agents, such as a silane water repellent, a non-stick ceramic coating, a fluorine resin coating, and the like, may be used alone or in combination.

Another technical subject matter of the present invention is a heating cooker comprising the ceramic heating element produced by the above-mentioned method. Some embodiments of the heating cooker will now be described.

Figure 4:
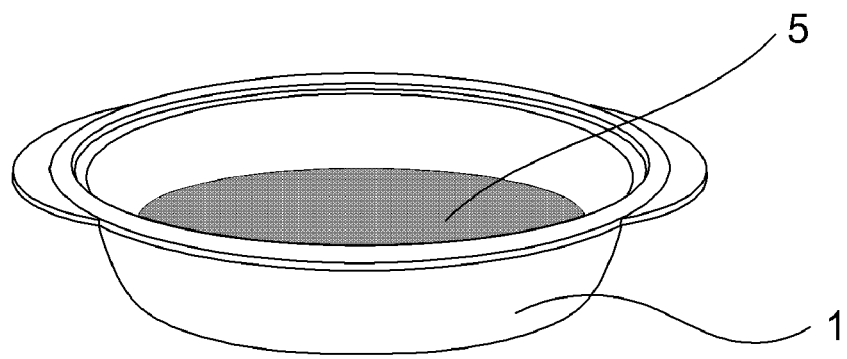
FIG. 4 is a perspective view showing still another embodiment of the present invention.

In one embodiment, as shown in FIG. 4, a heating cooker is proposed, comprising: a heating element 5 attached to the upper surface of the bottom of a cooker body 1; and a non-stick water-repellent coating 6 formed on the upper surface of the heating element 5. Since the heating element materials of the present invention are based on metallic iron oxide, they have better thermal retention ability and thermal conductivity than common ceramics. Thus, when these materials are applied to the inner bottom of the cooker to a predetermined thickness, they exhibit excellent performance.

Namely, for example, when the heating element of the present invention is applied to the inner bottom of a frying pan, food that is cooked in the flying pan does not burn well, and smoke is not generated, unlike common metallic flying pans, indicating that the frying pan can be used as an environmentally friendly cooker. In addition, the taste and flavor of the food can be maintained, since the food is cooked by far infrared heat emitted from the heating element 5. Furthermore, there is an advantage in that the bottom of the pan is not heated to high temperature, and thus the lifespan of the coating can be dramatically extended.

This embodiment may be used for various purposes in various heating devices, including a microwave oven, a gas range, an induction range, an oven, an electric range, and the like.

Figure 5:
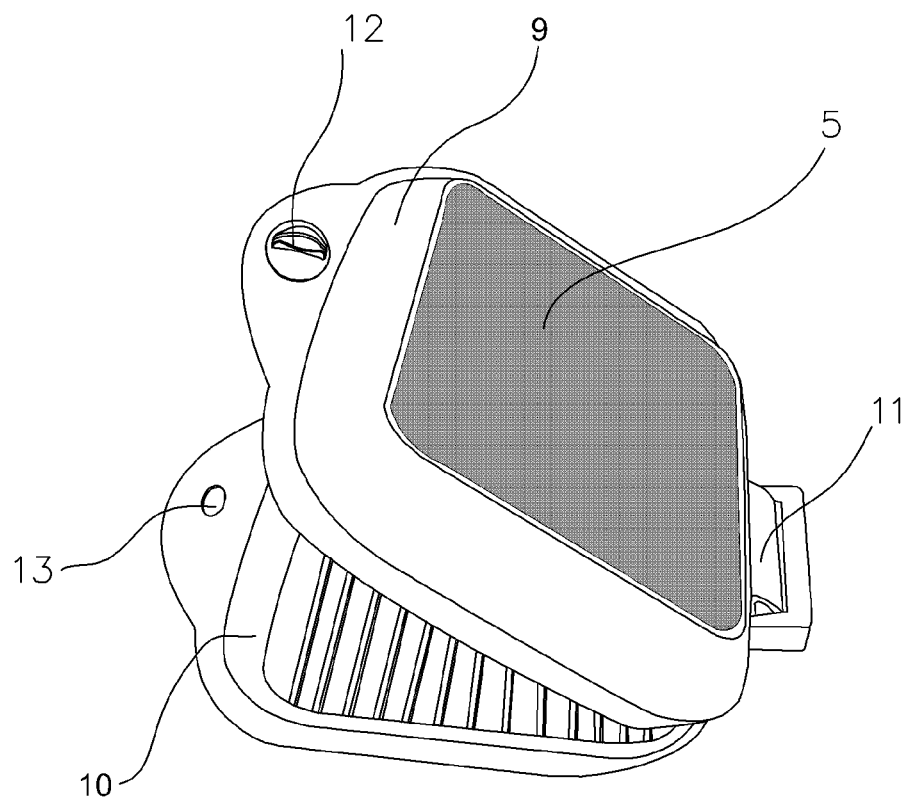
FIG. 5 is a perspective view showing still another embodiment of the present invention.

In another embodiment, as shown in FIG. 5, a double-sided heating cooker is proposed, comprising: an upper tray 9 and a lower tray 10, which are manufactured by the above-mentioned method; a hinge 11 formed at one side of each of the upper tray 9 and the lower tray 10; and a locking handle 12 and a coupling hole 13, formed at the other side. In this case, the heating element 5 is attached to the heating element groove of each of the upper tray 9 and the lower tray 10, so that both the upper and lower sides generate heat by absorbing microwaves.

According to this embodiment, both the upper and lower sides may be used for cooking when sandwich bread, steak, fish or the like is baked.

Figure 6:
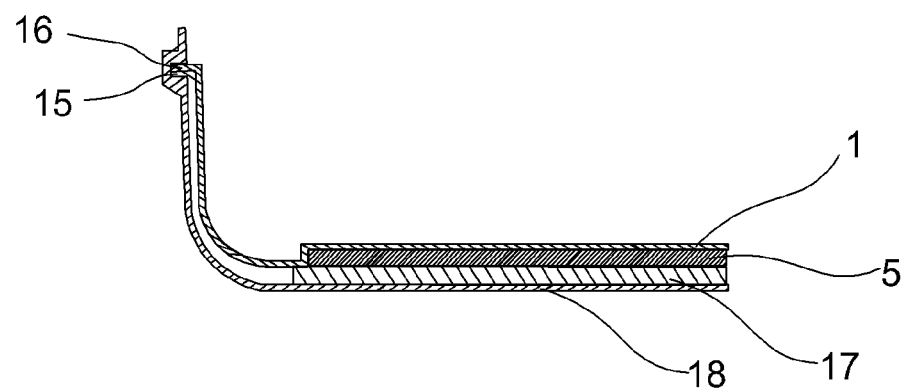
FIG. 6 is a perspective view showing still another embodiment of the present invention.

In still another embodiment, as shown in FIG. 6, a heating cooker is proposed, which is configured such that: a ceramic thermal insulating sheet 17 is disposed in contact with the lower surface of a heating element 5 attached to the lower surface of a cooker body 1 such as a pan; the heating cooker comprises a support 18 formed along the outside of the cooker body 1 so as to be parallel with the outside while coming in contact with the lower surface of the ceramic thermal insulating sheet 17; and an engaging protrusion 15 protruding externally from the upper edge of the cooking body 1 is fitted in an engaging groove 15 formed on the inner side of the upper edge of the support 18, so that the support 18 supports the heating element 5 upward by an upward pressure which is applied to the ceramic thermal insulating sheet 17, and thus the heating element 5 is attached closely to the lower surface of the bottom of the cooker body 1.

According to this embodiment, a support means capable of attaching the support 18 upward is used as a means for further increasing the adhesion of the heating element 5 of the present invention, so that the heating element is attached upward to the bottom of the cooker body 1.

According to this embodiment, when the adhesion of the heating element 5 needs to further be increased, the support 18 which is an auxiliary means is used to prevent the heating element from being detached. The ceramic thermal insulating sheet 17 inhibits the heat of the heating element 5 from being conducted downward and allows the heat to be transmitted only upward. This can further increase the heating power and can make it possible to easily and safely handle a heated cooker after cooking.

The material of the support 18 is preferably a heat-resistant plastic or silicone material, a ceramic material, a glass material or the like, which is permeable to microwaves.

Figure 7:
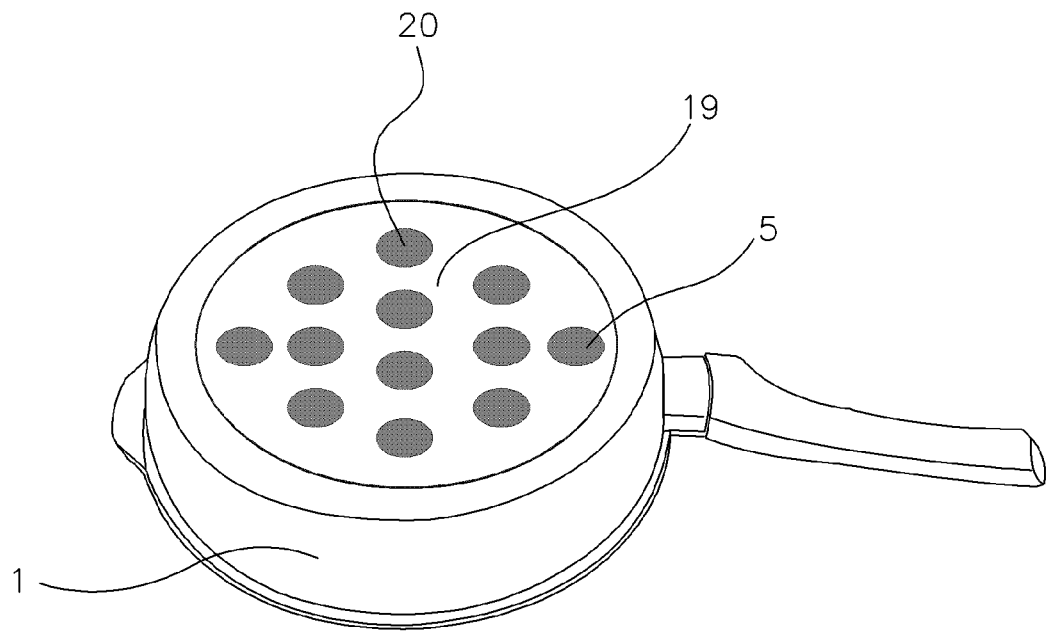
FIG. 7 is a perspective view showing yet another embodiment of the present invention.

In still another embodiment, as shown in FIG. 7, a heating cooker is proposed, in which a metallic cover 19 having a plurality of holes formed therein is provided on the outer surface of the bottom of the heating element 5 of the cooker body 1. The material of the metallic cover 19 is composed of an iron (Fe) component, so that heat can be generated by induction heating of the induction range. The holes 20 preferably have a size of 20 to 30 mm, so that microwaves can be sufficiently introduced.

According to this embodiment, induction heating of an induction range and dielectric heating of a microwave oven can be effectively used at the same time. In addition, the heating cooker according to this embodiment may advantageously be used in various heating means, including a gas range, an microwave oven, an induction range, an oven, an electric range and the like.

Figure 3:
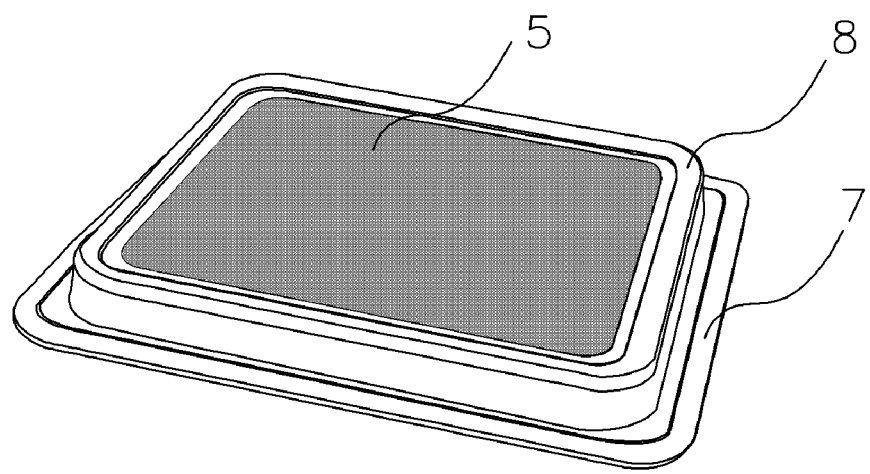
FIG. 3 is a perspective view showing another embodiment of the present invention.
Figure 8:
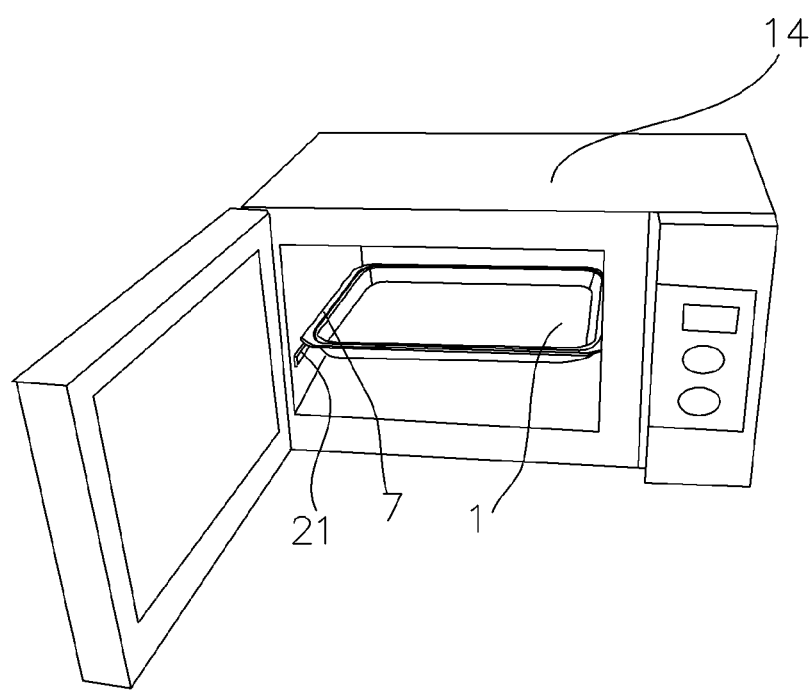
FIG. 8 is a view showing one example in which the present invention is used.

In still another embodiment, as shown in FIGS. 3 and 8, a mounting tray for a microwave oven, which is an example of the cooker body 1, is proposed. In order to prevent spark generation in the metallic tray, the mounting tray for a microwave oven comprises: a bottom insulating cover 8 formed along the outer edge of the bottom surface of a tray 1; and a handle insulating cover 7 formed along the upper edge of the tray 1. The bottom insulating cover 8 and the handle insulating cover 7 are made of an insulating material, such as a silicone rubber or heat-resistant plastic material. In addition, a heating element groove 2 is formed on the bottom surface of the tray 1, and the heating element 5 according to the present invention is applied to the heating element groove 2 to a predetermined thickness.

According to this embodiment, as shown in FIG. 8, the tray 1 is mounted in the cooking chamber of a microwave oven by left and right hanging protrusions 21, so that food can be heated by heat emitted from the bottom of the tray 1 by microwaves.

In addition, an electric heater may further be provided in the upper portion of the microwave oven, so that the lower portion of food can be heated by heat emitted from the tray 1 and the upper portion of the food can be heated by the heat of the heater. In this case, an oven function that heats the upper and lower portions of the food at the same time can be achieved.

Furthermore, the microwave waveguide of the microwave oven that is used in the present invention is formed below the tray 1, and a stirrer which is a microwave dispersing device is provided, so that microwaves can be dispersed without being concentrated on a portion of the heating element, thereby preventing the heating element from being damaged thermally and enabling food to be cooked evenly.

Test Example Using the Present Invention

Test Method (1) Tray molding (tray to be tested: a circular container having 0.8 mm thickness*220 mm diameter*30 mm height)

(2) Surface sanding (or matt enamel layer coating)

(3) Heating element application and molding

① Mill scale (or steelmaking slag or magnetite) having a particle size of 3 mm or less: 100 g ② Inorganic binder (obtained by adding and stirring 30 g of silica sol containing 8 to 30 wt % of colloidal silica+6 g of flay ash+1 g of quick hardening cement)

③ Applied flat to a heating element groove, formed on the tray bottom, to a thickness of 1.5 to 2 mm.

(4) Drying: non-stick water-repellent coating on the surface of the dried heating element.

(4) Cured in a tunnel-type heating furnace at a temperature of 300 to 350° C. for 30 minutes to 1 hour.

Performance of the Heating Element (1) Heating Performance

At a high-frequency output of 700 W, heating performance corresponding to a tray bottom temperature of 300 to 320° C. appeared, at a high-frequency output of 1000 W, heating performance corresponding to a tray bottom temperature of 350 to 400° C. appeared.

(2) It was shown that the pencil hardness was 9 or higher.

(3) Test for Thermal Expansion and Shrinkage Performance

Immediately after thermal curing at about 350° C., cold water at about 15° C. was poured onto the cooker, and whether cracking and detachment would occur was observed: did not occur.

(4) Impact Strength Test

Dropping of the heating tray from a height of 1 M: the heating element was neither cracked nor detached.

As described above, according to the method for manufacturing the heating cooker according to the present invention and the heating cooker manufactured by the method, the silica sol is used as a basic binder instead of silicone rubber and forms an amorphous three-dimensional network structure comprising siloxane bonds. Accordingly, the heating element is attached directly to the pan bottom, and thus is adapted well to thermal expansion and shrinkage.

The basic inorganic binder that is used in the present invention is a silica sol and has an advantage in that it can be cured at a relatively low temperature of 150 to 200° C., thus reducing the production cost.

The heating element of the present invention remains completely attached to the cooker bottom even at high temperature, and thus has excellent durability and is highly applicable for the production of a compact product.

The drawings provided for the description of the present invention show embodiments of the present invention, and it can be understood that the embodiments can be combined in various forms as shown in the drawings so that the subject matter of the present invention is realized.

Accordingly, the scope of the present invention is not limited to the above-described embodiments, and any person skilled in the art will appreciate that various modifications are possible, departing from the technical subject matter and spirit of the present invention as defined in the appended claims.

INDUSTRIAL APPLICABILITY

The present invention provides a heating cooker comprising a ceramic heating element employing microwaves. The heating cooker uses clean energy generated by converting electrical energy (which is secondary energy) into future-type high-efficiency tertiary energy, and thus can save energy. In addition, the present invention provides a highly efficient ceramic heating tray employing microwaves, which can reduce greenhouse gas emissions by reducing carbon dioxide which is generated from gas energy (which is fossil fuel) and which is the major cause of global warming. The ceramic heating tray may be used in various fields, such as a home cooker for a microwave oven, a microwave-based dryer, a food processor, a water heater, and the like.

The invention claimed is:

1. A method for manufacturing a ceramic cooker comprising a ceramic heating element, the method comprising:
    a cooker body preparation step of preparing a cooker body by molding;
    a heating element material preparation step of preparing, as a microwave-absorbing ceramic element material, any one or more selected from among mill scale, steelmaking slag and magnetite ($Fe_3O_4$), which are ferromagnetic materials and have a particle size of 3 mm or less;
    an inorganic binder preparation step of preparing, as an inorganic binder, a colloidal silica sol having a colloidal silica content of 8 to 30 wt % by adding acetic acid to sodium silicate in an amount of 1.2 to 2 parts by weight of acetic acid based on 100 parts by weight of sodium silicate, followed by stirring for 30 minutes to 1 hour, thereby forming a silicate, and then adding a solvent to the silicate such that a content of the solvent is 70 to 92 wt %, followed by stirring for 2 to 3 hours;
    a mixing step of mixing 20 to 40 parts by weight of the colloidal silica sol as the inorganic binder with 100 parts by weight of the heating element material, thereby making a heating element paste;
    an application step of applying the heating element paste, obtained by the mixing, to a bottom of the cooker body; and
    a drying and curing step of drying and curing the heating element paste applied to the bottom of the cooker body at a thickness of 1.5 to 2.0 mm, thereby forming a solid heating element,
    wherein the solid heating element is porous and in which pores are formed between particles of the solid heating element, and
    wherein at a high-frequency output of 700 W, heating performance corresponding to a temperature of 300 to 320° C. appears such that the heating element paste remains completely attached to the bottom of the cooker body, and at a high-frequency output of 1000 W, heating performance corresponding to a temperature of 350 to 400° C. appears such that the heating element paste remains completely attached to the bottom of the cooker body.

2. The method of claim 1, further comprising, after the cooker body preparation step, a surface treatment step of treating a surface of the bottom of the cooker body in order to increase adhesion between the heating element and the bottom of the cooker body.

3. The method of claim 2, wherein the surface treatment step comprises performing one or more processes, selected from among sanding and matt enamel layer coating, on the surface of the bottom of the cooker body.

4. The method of claim 3, further comprising, after the drying and curing step, a non-stick water-repellent coating step of subjecting the surface of the heating element to non-stick water-repellent coating.

5. The method of claim 2, further comprising, after the drying and curing step, a non-stick water-repellent coating step of subjecting the surface of the heating element to non-stick water-repellent coating.

6. The method of claim 1, wherein the application step preferably comprises applying the mixture of the heating element material and the inorganic binder to any one surface selected from among an upper surface and lower surface of the cooker body.

7. The method of claim 6, further comprising, after the drying and curing step, a non-stick water-repellent coating step of subjecting the surface of the heating element to non-stick water-repellent coating.

8. The method of claim 1, wherein the cooker body preparation step comprises forming a heating element groove on the bottom of the cooker body, and the application step comprises applying the heating element paste to the heating element groove.

9. The method of claim 8, further comprising, after the cooker body preparation step, a surface treatment step of treating a surface of the heating element groove in order to increase adhesion between the heating element and the heating element groove.

10. The method of claim 9, wherein the surface treatment step comprises performing one or more processes, selected from among sanding and matt enamel layer coating, on the surface of the heating element groove.

11. The method of claim 8, further comprising, after the drying and curing step, a non-stick water-repellent coating step of subjecting the surface of the heating element to non-stick water-repellent coating.

12. The method of claim 1, further comprising, after the drying and curing step, a non-stick water-repellent coating step of subjecting the surface of the heating element to non-stick water-repellent coating.

13. The method of claim 1, wherein the inorganic binder further comprises, based on 100 parts by weight of the colloidal silica sol, 10 to 30 parts by weight of any one or more selected from among fly ash and silica fume.

14. The method of claim 1, wherein the inorganic binder further comprises, based on 100 parts by weight of the colloidal silica sol, 1.5 to 6 parts by weight of quick hardening cement.

15. The method of claim 1, wherein the application step comprises embedding any one or more, selected from among wire mesh and glass fiber mesh, into the heating element.

* * * * *